(12) United States Patent
Liebig

(10) Patent No.: US 6,340,002 B1
(45) Date of Patent: Jan. 22, 2002

(54) HEAT-RECOVERY STEAM GENERATOR

(75) Inventor: Erhard Liebig, Laufenburg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/709,326

(22) Filed: Nov. 13, 2000

(30) Foreign Application Priority Data

Dec. 9, 1999 (DE) .......................................... 199 59 342

(51) Int. Cl.⁷ ................................................ F22G 1/16
(52) U.S. Cl. ........................ 122/7 R; 122/4 D; 60/39.5
(58) Field of Search ................................ 122/4 D, 7 R, 122/459, 452, 479.5; 60/39.5, 39.182; 165/104.16

(56) References Cited

U.S. PATENT DOCUMENTS

| 4,106,286 A | 8/1978 | Sakai et al. | |
| 5,370,239 A | 12/1994 | Kidaloski et al. | |
| 5,555,718 A | 9/1996 | Anderson et al. | |
| 5,775,266 A | 7/1998 | Ziegler | |
| 5,946,901 A | * 9/1999 | Bauver et al. | 122/7 R |
| 6,050,226 A | * 4/2000 | Shimada et al. | 122/7 R |
| 6,092,490 A | * 7/2000 | Bairley et al. | 122/7 R |

FOREIGN PATENT DOCUMENTS

| DE | 69010105 T2 | 8/1990 |
| DE | 4319936 A1 | 12/1994 |
| DE | 19729597 A1 | 11/1998 |
| DE | 19744917 A1 | 4/1999 |
| DE | 19744917 A1 | 4/1999 |

* cited by examiner

*Primary Examiner*—Gregory Wilson
(74) *Attorney, Agent, or Firm*—Burns, Doane, Swecker & Mathis, L.L.P.

(57) ABSTRACT

In a heat-recovery steam generator (10) having individual flow passages (18) and a catalyst apparatus (15) which consists of individual catalyst sections provided with shut-off means, the passages can be shut off in simple manner by flow passages (18) and catalyst sections being allocated to one another in a suitable manner.

5 Claims, 3 Drawing Sheets

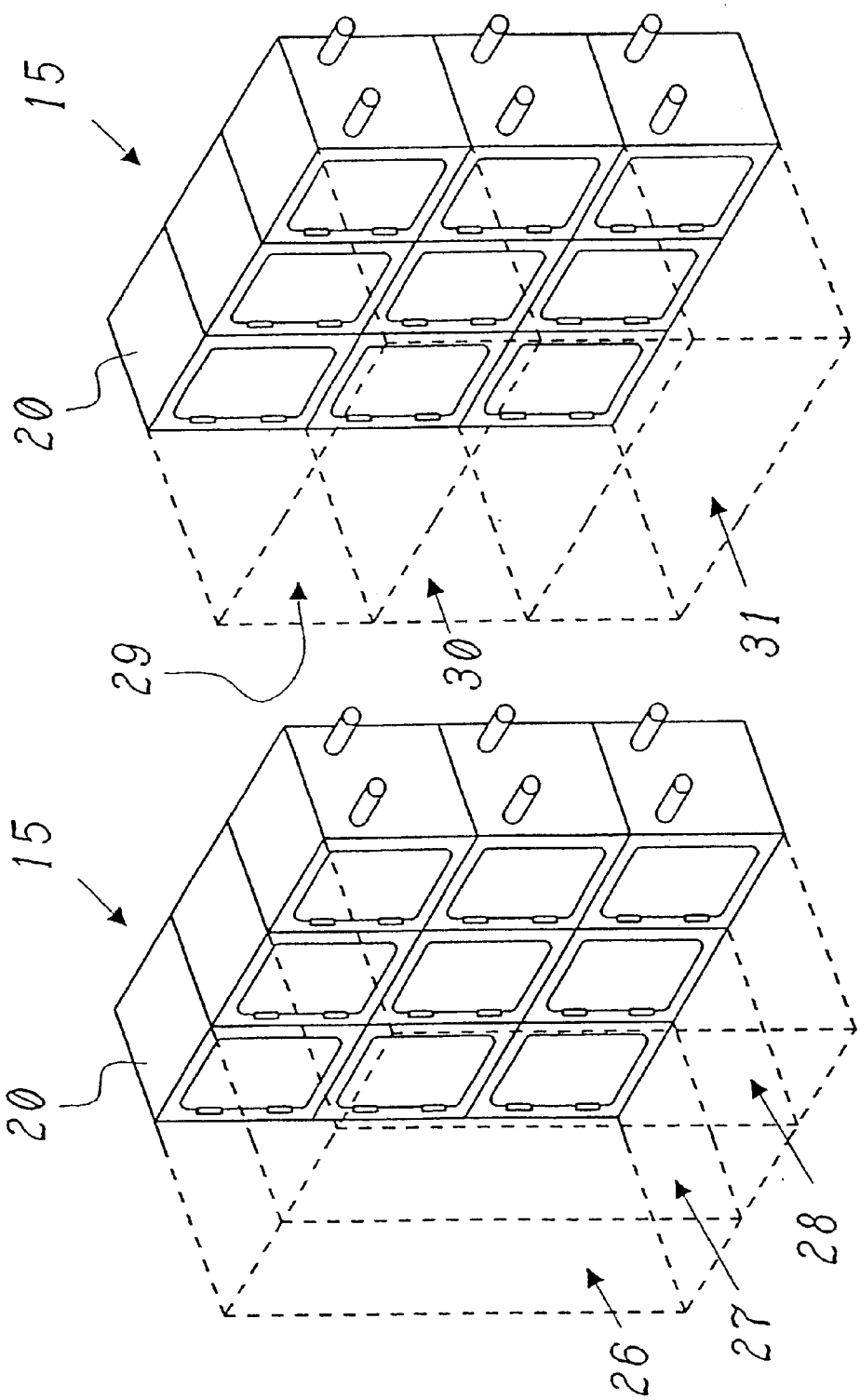

HEAT-RECOVERY STEAM GENERATOR

This application claims priority under 35 U.S.C. §§ 119 and/or 365 to Appln. Ser. No. 199 59 342.6 filed in Germany on Dec. 9. 1999; the entire content of which is hereby incorporated by reference.

The present invention relates to the field of power plant technology. It concerns a heat-recovery steam generator, in particular for a gas-turbine plant of a combined-cycle power plant, according to the preamble of claim 1.

Publication DE-A1-197 44 917, for example, has disclosed such a heat-recovery steam generator.

In the case of heat-recovery steam generators (HRSG) or heat-recovery boilers which, for example, are arranged downstream of the gas-turbine plants in combined-cycle power plants and generate steam for a steam turbine by means of the hot flue gases of the gas turbine, purging of the heat-recovery steam generator with air before restarting the plant after an interruption in operation is specified in normal practice and for safety reasons. This is intended to safely remove any residues of unburned fuel in the heat-recovery steam generator and thus avoid, for example, undesirable self-ignition.

The air required for the purging operation is provided by the gas turbine itself. To this end, the gas turbine is driven by the generator, operated as an electric motor, and draws in air with the compressor part and delivers the drawn-in air through the heat-recovery steam generator. Since the free cross section of flow of the heat-recovery steam generator is relatively large compared with the mass flow produced in this way by the gas turbine, only comparatively low flow velocities can be achieved by this type of purging. The result of this is that either the purging is incomplete or has to be carried out for a longer period.

To solve these problems, it has been proposed in publication DE-A1-197 44 917 mentioned at the beginning to subdivide the free cross section of flow of the heat-recovery boiler into a plurality of parallel flow passages which can be selectively shut off by means of a shut-off arrangement. In this way, by shutting off some of the flow passages, the cross section of flow in the boiler can be reduced to a fraction during the purging and—at the same air mass flow from the gas turbine—the flow velocity of the purging air can be increased considerably. In this case, rotary slide valves are used as the shut-off arrangement, these rotary slide valves being arranged at the foot of the exhaust-gas chimney on a central drive shaft. A disadvantage with this solution is that an independent, additional and mechanically complicated shut-off arrangement has to be provided there only for the purging operation.

The object of the invention is therefore to provide a heat-recovery boiler which, without additional outlay, permits rapid and reliable purging at a limited cross section of flow and thus increased flow velocity of the purging air.

This object is achieved by all the features of claim 1 together. The invention is based on the fact that, on account of the increasingly stricter exhaust-gas regulations, the use of catalyst apparatuses in the heat-recovery boiler for the further reduction of, for example, nitrogen oxides and carbon monoxide is virtually obligatory. In the case of such catalyst apparatuses, it is normal practice, for example, to provide an absorption layer of potassium carbonate, by means of which the nitrogen oxides present can be converted into potassium nitrites and potassium nitrates. Since the absorption layers are exhausted during this conversion, the catalyst apparatuses have to be regenerated at regular intervals. To this end, the catalyst apparatuses are subdivided into individual catalyst sections which, for regeneration during operation, can be closed individually on the inlet side and outlet side by shut-off means such as flaps or the like. A suitable gas mixture which regenerates the absorption layers is then directed through such a closed-off catalyst section via special feed lines. The essence of the invention, then, is to also use the shut-off devices which are present anyway in such a catalyst apparatus for shutting off individual flow passages during the purging operation. In this way, it is possible to achieve effective and reliable purging of the heat-recovery boiler without additional constructional outlay.

In this case, it is conceivable for the number of flow passages to be equal to the number of catalyst sections, and for one of the catalyst sections to be allocated to each of the flow passages. However, it is also just as conceivable for the number of catalyst sections to be a multiple of the number of flow passages, and for a plurality of catalyst sections to be allocated to each flow passage.

The construction of the heat-recovery steam generator is especially simple if it is constructed in a modular manner from a plurality of heat-exchanger modules arranged one behind the other, and the catalyst apparatus is designed as a catalyst module.

The invention is to be explained in more detail below with reference to exemplary embodiments in connection with the drawing, in which:

FIG. 4 shows an allocation of catalyst sections and flow passages in a first exemplary embodiment of the invention; and FIG. 5 shows an allocation of catalyst sections and flow passages in a second exemplary embodiment of the invention.

Figure 1:
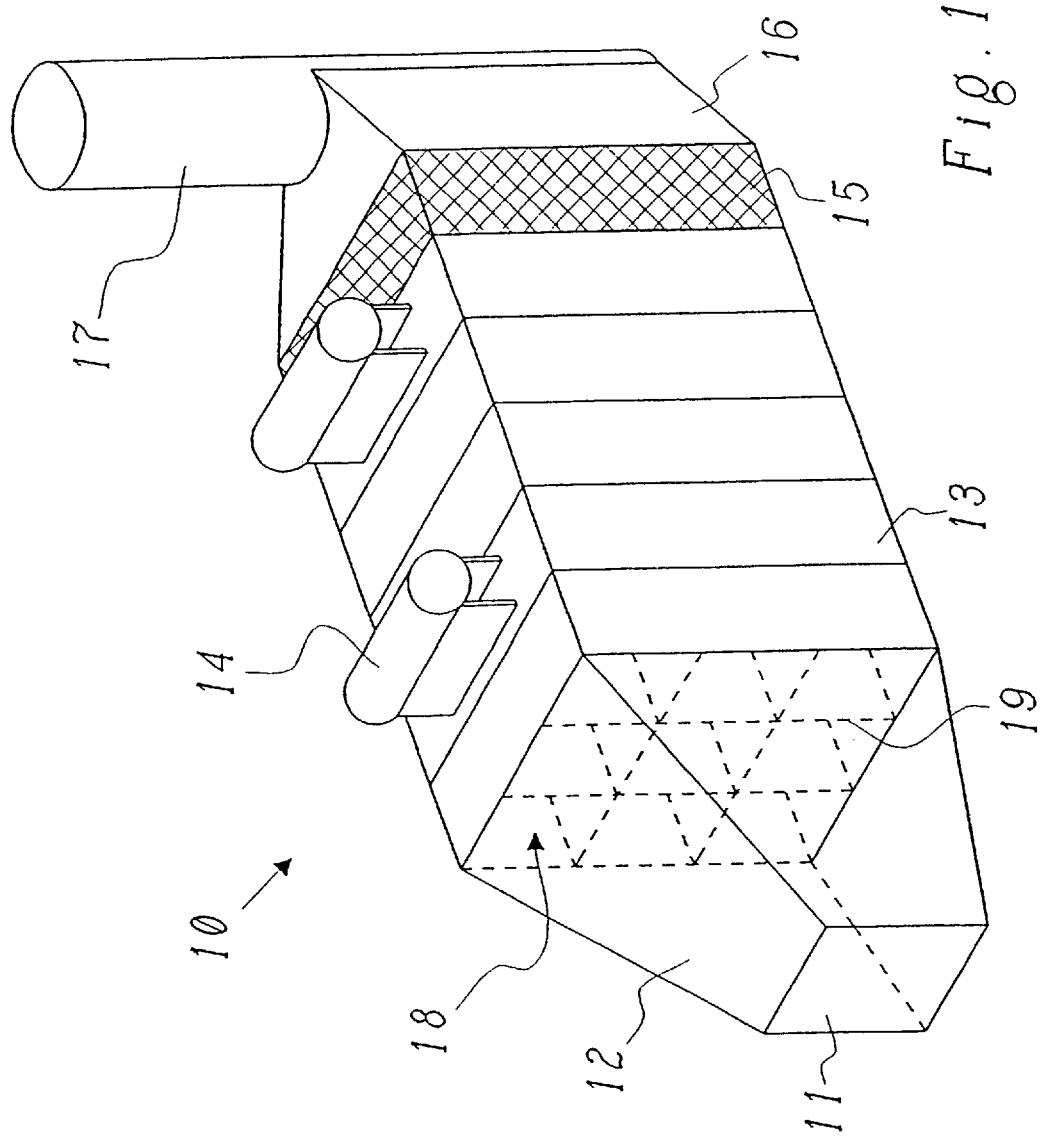
FIG. 1 shows the side view of a heat-recovery steam generator of modular construction, having vertical heating surfaces and a catalyst apparatus connected in between, as is suitable for realizing the invention, in perspective representation.

The side view of a heat-recovery steam generator of modular construction, having vertical heating surfaces and a catalyst apparatus connected in between, is reproduced in perspective representation in FIG. 1. On the inlet side, the heat-recovery steam generator 10 has an inlet opening 11 which is matched to the outlet of the gas turbine and from which an intermediate piece 12 widening in cross section leads to the actual steam-generator part, which consists of a plurality of heat-exchanger modules 13 arranged one behind the other and having mounted steam-generator drums 14, which are connected to the water/steam circuit of the combined-cycle power plant via appropriate connection fittings. Once the flue gas from the gas turbine has flowed through the heat-exchanger modules 13, it is directed through a transition piece 16 into an exhaust-gas flue 17 and delivered to the environment. In this respect, the heat-recovery steam generator 10 corresponds to the heat-recovery boilers as described in FIG. 1 of U.S. Pat. No. 5,370,239 or in DE-A1-197 44 917 mentioned at the beginning.

Figure 3:
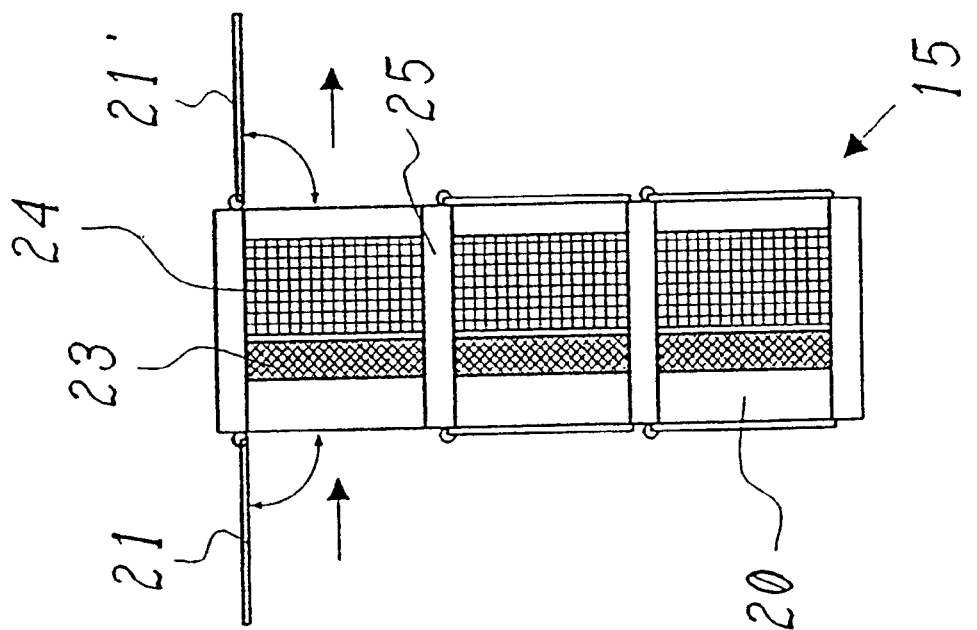
FIG. 3 shows the internal construction of a catalyst apparatus according to FIG. 2 in plan view.
Figure 2:
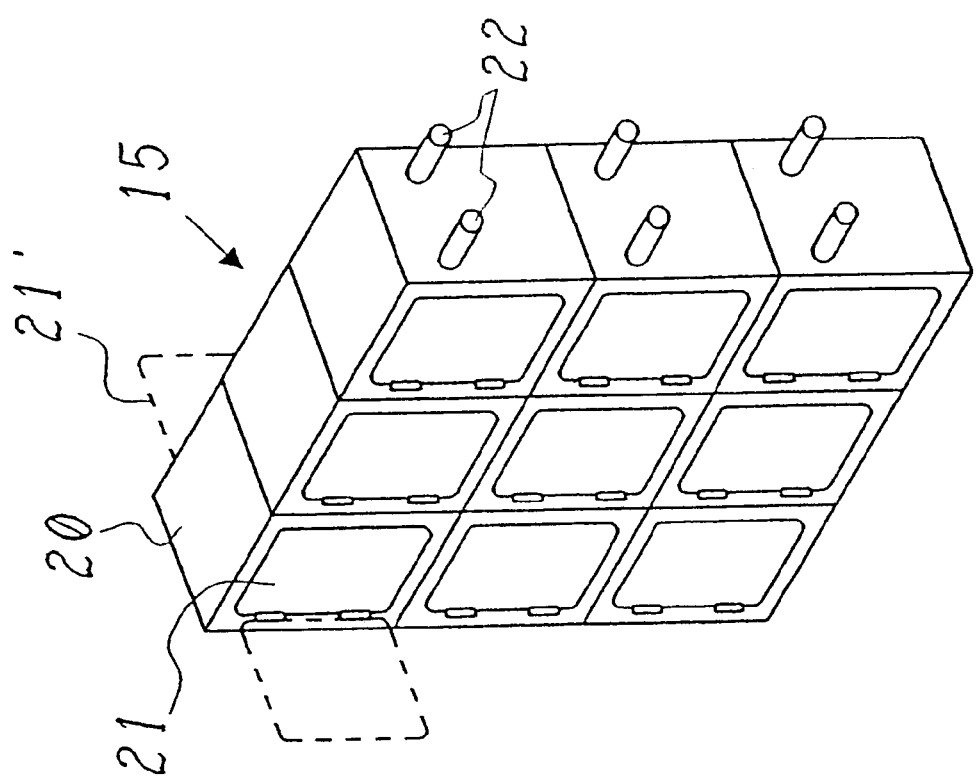
FIG. 2 shows the side view of a catalyst apparatus consisting of individual catalyst sections provided with shut-off means, as is suitable for realizing the invention, in perspective representation.

In the heat-recovery steam generator 10 of FIG. 1, unlike the abovementioned known heat-recovery steam generators, a catalyst apparatus, in particular in the form of a catalyst module 15, is arranged between or downstream of the heat-exchanger modules 13, and this catalyst module 15 further reduces portions of NO and CO still present in the flue gas by oxidation and partial absorption. Such a catalyst apparatus 15, which is offered as a system, for example from the American company Goal Line Environmental Technologies, Los Angeles, under the trade mark "SCONOx", is shown on its own in FIGS. 2 and 3. It consists of a plurality (nine in the example) of individual catalyst sections 20, which work in parallel, are separated by intermediate walls 25, have various catalysts 23, 24 in the interior, and can be closed individually on both the inlet side and the outlet side by appropriate shut-off means, flaps 21, 21' in the present example. In FIG. 2, the two flaps 21, 21' of a selected catalyst section are shown in the open position by broken lines; these two flaps are open in FIG. 3.

When the catalyst sections 20 perform their catalyst function during normal operation, the associated pair of flaps 21, 21' is open (FIG. .3, top section). If the absorption effect of the catalyst section is exhausted after a certain operating period, this section has to be regenerated. For this purpose, the section is removed from the flow by closing its flaps. By means of an appropriate feed line 22, a gas mixture which regenerates the catalysts 23, 24 of the section again can then be directed from outside through the closed section. After the regeneration phase has been completed, the catalyst section can then be connected into the flue-gas flow again by opening its flaps.

If the operation of the plant is interrupted, the catalyst sections 20 provided with shut-off means may be used according to the invention, without extra cost, to improve the requisite purging of the heat-recovery steam generator 10. To this end, the free cross section of flow of the heat-recovery steam generator 10 is subdivided by appropriate dividing walls 19 into separate, parallel flow passages 18, which are correlated with the catalyst sections 20 of the catalyst apparatus 15. For example, if the cross section of flow is subdivided into nine flow passages 18—as indicated in FIG. 1—and if the catalyst apparatus 15 likewise has nine catalyst sections 20, one of the sections may be allocated as a shut-off device to each of the flow passages 18. If one of the flow passages 18 is then to be purged, the flap pairs in the eight catalyst sections which are allocated to the remaining flow passages are closed.

However, the flow passages and catalyst sections may also be allocated to one another in a different manner from a 1-to-1 allocation. Examples of other allocations are indicated in FIGS. 4 and 5. In FIG. 4, the free cross section of flow is subdivided into three flow passages 26, 27 and 28 lying next to each other. Three of the nine catalyst sections 20 are then allocated to each of these flow passages 26–28 and have to be actuated simultaneously for shutting off or opening. A comparable 1-to-3 allocation with flow passages 29, 30 and 31 lying one above the other is shown in FIG. 5.

Other allocations are likewise conceivable. Likewise, it is conceivable to use the invention not only in the horizontal heat-recovery boiler shown, but also in vertical heat-recovery boilers. In this case, it is immaterial whether the heating surfaces run vertically or horizontally inside the heat exchangers. The realization of the invention is independent of the type of construction, the heating-surface arrangement and the steam-generating principle. It is merely essential for the invention that individual flow passages and individual catalyst sections provided with shut-off means can be allocated to one another.

LIST OF DESIGNATIONS

10 Heat-recovery steam generator
11 Inlet opening
12 Intermediate piece
13 Heat-exchanger module
14 Steam-generator drum
15 Catalyst apparatus
16 Transition piece
17 Exhaust-gas flue
18 Flow passage
19 Dividing wall
20 Catalyst section
21, 21' Flap
22 Feed line (catalyst section)
23, 24' Catalyst
25 Intermediate wall
26–28 Flow passage
29–31 Flow passage

What is claimed is:

1. A heat-recovery steam generator (10), in particular for a gas-turbine plant of a combined-cycle power plant, the free cross section of flow of the heat-recovery steam generator (10) being subdivided into a plurality of parallel flow passages (18, 26–28; 29–31), and shut-off means (21, 21') being provided, by means of which the flow passages (18; 26–28; 29–31), in particular for purging the heat-recovery steam generator (10), can be shut off in a selective manner in order to prevent throughflow, characterized in that the heat-recovery steam generator (10) comprises at least one catalyst apparatus (15) lying in the flow, in that the catalyst apparatus (15) is subdivided into a plurality of catalyst sections (20) with regard to the cross section of flow, in that the individual catalyst sections (20) can be shut off on the inlet side and outlet side to prevent throughflow in order to regenerate the catalysts, and in that the flow passages (18; 26–28; 29–31) and catalyst sections (20) are allocated to one another in such a way that individual flow passages can be shut off by shutting off the allocated catalyst section(s).

2. The heat-recovery steam generator as claimed in claim 1, characterized in that the number of flow passages (18; 26–28; 29–31) is equal to the number of catalyst sections (20), and in that one of the catalyst sections (20) is allocated to each of the flow passages (18; 26–28; 29–31).

3. The heat-recovery steam generator as claimed in claim 1, characterized in that the number of catalyst sections (20) is a multiple of the number of flow passages (18; 26–28; 29–31), and in that a plurality of catalyst sections (20) are allocated to each flow passage.

4. The heat-recovery steam generator as claimed in one of claims 1, characterized in that the catalyst apparatus (15) is designed for the oxidation of NO and/or CO to $NO_2$ or $CO_2$.

5. The heat-recovery steam generator as claimed in claim 1, characterized in that the heat-recovery steam generator (10) is constructed in a modular manner from a plurality of heat-exchanger modules (13) arranged one behind the other, and in that the catalyst, apparatus is designed as a catalyst module (15).

* * * * *